United States Patent
Pomerantz et al.

(10) Patent No.: US 7,483,552 B1
(45) Date of Patent: Jan. 27, 2009

(54) PREVENTING SIGNATURE REPUDIATION IN PAPER DOCUMENTS USING SMART PENS

(75) Inventors: Ori Pomerantz, Austin, TX (US); Louis T. Fuka, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/129,337

(22) Filed: May 29, 2008

(51) Int. Cl.
*G06K 9/00* (2006.01)

(52) U.S. Cl. .................................. 382/116; 340/5.83

(58) Field of Classification Search ............... 382/115, 382/116, 119, 124, 313, 314; 356/71; 340/5.52, 340/5.53, 5.8, 5.82, 5.83, 5.86
See application file for complete search history.

(56) References Cited

U.S. PATENT DOCUMENTS

| | | | |
|---|---|---|---|
| 5,103,486 A | * | 4/1992 | Grippi ........................... 382/4 |
| 5,544,255 A | * | 8/1996 | Smithies et al. ............. 382/119 |
| 6,030,001 A | * | 2/2000 | Kruckemeyer ................ 283/70 |
| 6,870,966 B1 | * | 3/2005 | Silverbrook et al. ......... 382/313 |
| 7,082,213 B2 | | 7/2006 | Black .......................... 382/124 |
| 7,110,576 B2 | | 9/2006 | Norris, Jr. et al. ............ 382/119 |
| 2005/0063562 A1 | * | 3/2005 | Brunk et al. ................. 382/100 |
| 2005/0186017 A1 | | 8/2005 | Brandstein ................... 401/215 |

FOREIGN PATENT DOCUMENTS

WO 2006/036853 A3 4/2006
WO 2006/085783 A1 8/2006

\* cited by examiner

*Primary Examiner*—Andrew W Johns
(74) *Attorney, Agent, or Firm*—Mark S. Walker; Suiter Swantz pc llo

(57) ABSTRACT

The present disclosure is directed to a method for preventing signature repudiation. This method receives the user's fingerprint and embeds special markings on the document being signed. The method then transmits the information regarding the signing of the document, such as images of the document, fingerprints, times and locations of the signing, to a third party receiver.

1 Claim, 1 Drawing Sheet

PREVENTING SIGNATURE REPUDIATION IN PAPER DOCUMENTS USING SMART PENS

TECHNICAL FIELD

The present disclosure generally relates to the field of writing utensils, and more particularly to a method for preventing signature repudiation by using a smart pen.

BACKGROUND

There are many times in a person's life when he or she has to sign an important document, such as a contract, a mortgage, or a credit card application. The common solution is to have the documents notarized—but the signor can always claim the notary, an employee of the organization that benefits from the contract, has been compromised. Documents which are notarized and include a digital signature would reduce signature repudiation.

SUMMARY

The present disclosure is directed to a method for authenticating a signed document. This method receives the user's fingerprint and embeds special markings on the document being signed. The method then transmits the information regarding the signing of the document, such as images of the document, fingerprints, times and locations of the signing, to a third party receiver.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying FIGURE in which.

DETAILED DESCRIPTION

Figure 1:
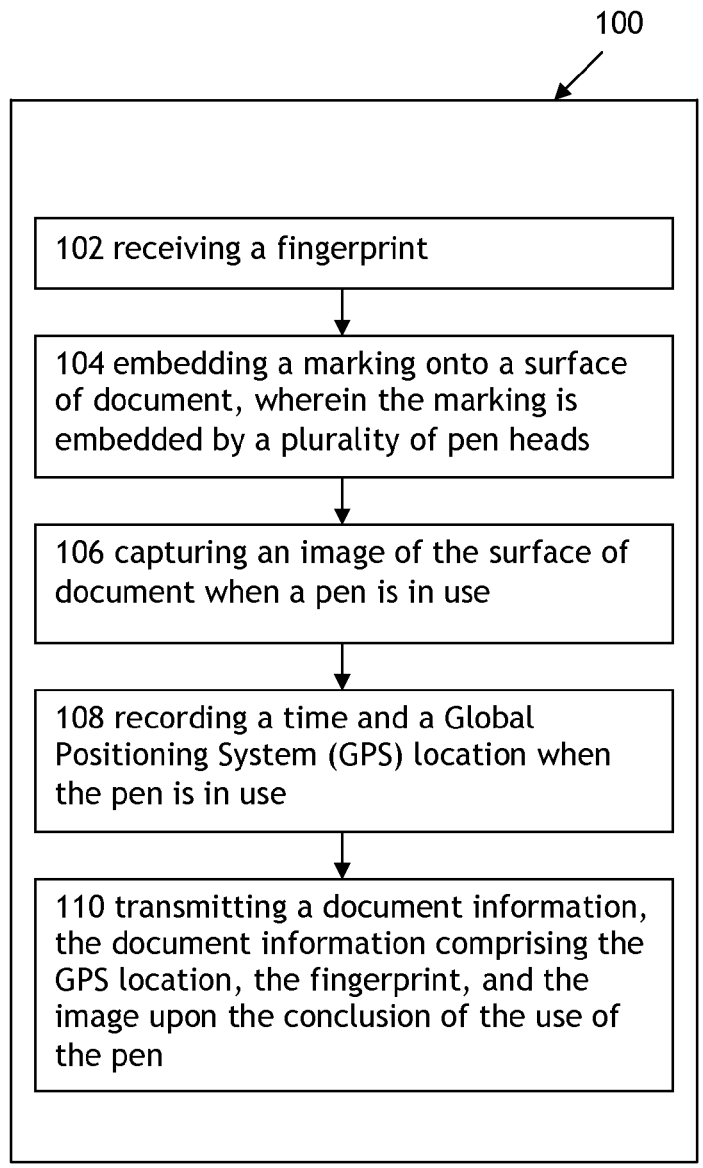
FIG. 1 is a flow diagram of the method for using a smart pen.

Reference will now be made in detail to the subject matter disclosed, which is illustrated in the accompanying drawings.

The present disclosure is directed to a method for authenticating a signed document. This method receives the user's fingerprint, stores a representation of the fingerprint and embeds special markings on the document being signed. The method then transmits the information regarding the signing of the document, such as images of the document, representations of fingerprints, times and locations of the signing, to a third party receiver.

FIG. 1 is a flow diagram of the method for using a smart pen. The method for using a smart pen 100 first receives a fingerprint from the user 102. Receiving a fingerprint may include storing a representation of a fingerprint. The method 100 then embeds markings onto a surface of document, wherein the markings are embedded by a plurality of print heads 104. Then, the method 100 captures an image of the surface of document when a pen is in use 106. After the capturing of an image 106, the method 100 records a time and a Global Positioning System (GPS) location when the pen is in use 108. Finally, the method 100 transmits a document information, the document information comprising the GPS location, the representation of the fingerprint, and the image upon the conclusion of the use of the pen 110.

The pen may comprise a pen housing having a first end, the first end comprising a plurality of print heads. Then, a plurality of springs contained within the pen housing exerts an outward force onto the associated plurality of print heads. An electromagnet contained within the pen housing exerts an inward force onto the plurality of print heads. The pen also comprises a control chip that is contained within the pen housing. A fingerprint reader is also attached to the outside of the pen housing, oriented to capture an image surrounding the first end. The plurality of print heads embeds markings onto a document being signed, the fingerprint reader receives the user's fingerprint, the control chip transmits and receives information, and the camera captures images of the document being signed.

The smart pen is constructed by replacing a conventional ball on the pen point with print heads. The print heads embed unique markings when signing the document. These print heads may be spaced close enough to each other so that regardless of what part of the pen point is used, at least some of the print heads may touch the document.

Each of the print heads may include a spring pushing it out and an electromagnet holding it in.

The pen may include a control chip located in the center of the pen casing which receives commands using a protocol such as Bluetooth and embeds the markings based upon the commands.

The pen may also include a battery inside the chip which is charged using electrical induction with a loop of wire. The pen will need to be placed on a charger periodically to recharge the chip.

To use the smart pen, the user presses a finger on the fingerprint reader and holds the smart pen as the user would any other writing utensil. As long as the pen is held, the fingerprint is valid. As soon as the user puts the smart pen down, the fingerprint becomes invalid. The pen records the fingerprint of the user, and captures an image of the document being signed. The controller sends fingerprint as well as the image, along with the time and the GPS location, to a third party server and embeds a mark on the document. This information will be available in the future if the signer chooses to repudiate the signature.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for preventing signature repudiation, comprising:
   receiving a fingerprint;
   storing a representation of said fingerprint;
   embedding a marking onto a surface of a document, wherein the marking is embedded by a plurality of print heads;
   capturing an image of the surface of the document when a pen is in use; and
   transmitting a document information, the document information including the representation of the fingerprint and the image.

* * * * *